Nov. 7, 1933. L. IVERSEN Re. 18,992

ROLL MOUNTING

Original Filed May 29, 1929 5 Sheets-Sheet 1

INVENTOR

Lorenz Iversen by Byrnes, Stebbins & Parmelee his Attys.

Nov. 7, 1933. L. IVERSEN Re. 18,992

ROLL MOUNTING

Original Filed May 29, 1929 5 Sheets-Sheet 2

INVENTOR

Lorenz Iversen by

Byrnes, Townsend & Parmelee his Attys.

Nov. 7, 1933. L. IVERSEN Re. 18,992

ROLL MOUNTING

Original Filed May 29, 1929 5 Sheets-Sheet 3

INVENTOR

Lorenz Iversen by Byrnes & Stebbins & Pannell his Attys.

Nov. 7, 1933. L. IVERSEN Re. 18,992

ROLL MOUNTING

Original Filed May 29, 1929 5 Sheets-Sheet 4

INVENTOR

Lorenz Iversen by Byrnes, Stebbins & Parmelee, his Attys.

Nov. 7, 1933. L. IVERSEN Re. 18,992

ROLL MOUNTING

Original Filed May 29, 1929 5 Sheets-Sheet 5

INVENTOR

Lorenz Iversen by Byrnes & Stebbins & Pamelee his Attys.

Reissued Nov. 7, 1933

Re. 18,992

UNITED STATES PATENT OFFICE 18,992

ROLL MOUNTING

Lorenz Iversen, Pittsburgh, Pa., assignor to Mesta Machine Company, Pittsburgh, Pa., a corporation of Pennsylvania Original No. 1,900,344, dated March 7, 1933, Serial No. 367,032, May 29, 1929. Application for reissue April 11, 1933. Serial No. 665,565

25 Claims. (Cl. 80—38)

This invention relates to the mounting of rolls in rolling mill housings, and more particularly to the mounting of the working rolls and their supporting rolls in a backed-up mill. By such a mill I mean one having a working roll which contacts with the material being rolled and in which the working face of the working roll is supported by the face of another roll which does not come into contact with the material being rolled. The four-high mill is a common form of the backed-up mill and has two working rolls, each supported by a backing roll.

Since the working rolls can be relatively small in diameter, as compared with the backing rolls, and since they make contact with the material being rolled, their faces are subject to more rapid wear than the faces of the backing rolls. For this reason it is frequently necessary to remove the working rolls from the mill housing to have their working faces refinished. It is also necessary at less frequent intervals to remove the backing rolls to refinish their faces.

The chucks for the working and backing rolls in the ordinary type of backed-up mill are independently mounted in the windows of the mill housings. The alinement of the working and backing rolls is governed by the accuracy to which the relatively large and heavy mill housings can be machined and by the relatively large clearances necessary in the housing windows for the bearing chucks. The independent mounting of the working and backing rolls in the windows of the mill housings impairs the alinement of the working roll with its backing roll, and the advantage of using anti-friction bearings is lost to a considerable extent so far as alinement of the rolls is concerned. In mills for sheet and strip rolling this alinement is of extraordinary importance to avoid excessive longitudinal thrust of the rolls, to increase the roll life, to roll an accurate product and to deliver the material straight from the mill, i. e. at right angles to the parallel axes of the mill rolls.

My invention provides a mill which facilitates changing the rolls by providing a roll mounting which permits easy and quick removal and reinstallation, not only of the backing rolls but, what is more important, allows a quick replacement of either working roll without affecting the mounting of or requiring the removal from the mill housings of any of the backing rolls.

The working rolls are accurately alined with their respective backing rolls by mounting the bearing chucks of the working rolls in the chucks of their respective backing rolls. The alinement of the rolls is aided by the use of anti-friction bearings for the journals of both working and backing rolls, and by the manner in which the bearing chucks of the working rolls are mounted in the bearing chucks of their respective backing rolls.

Figure 1:
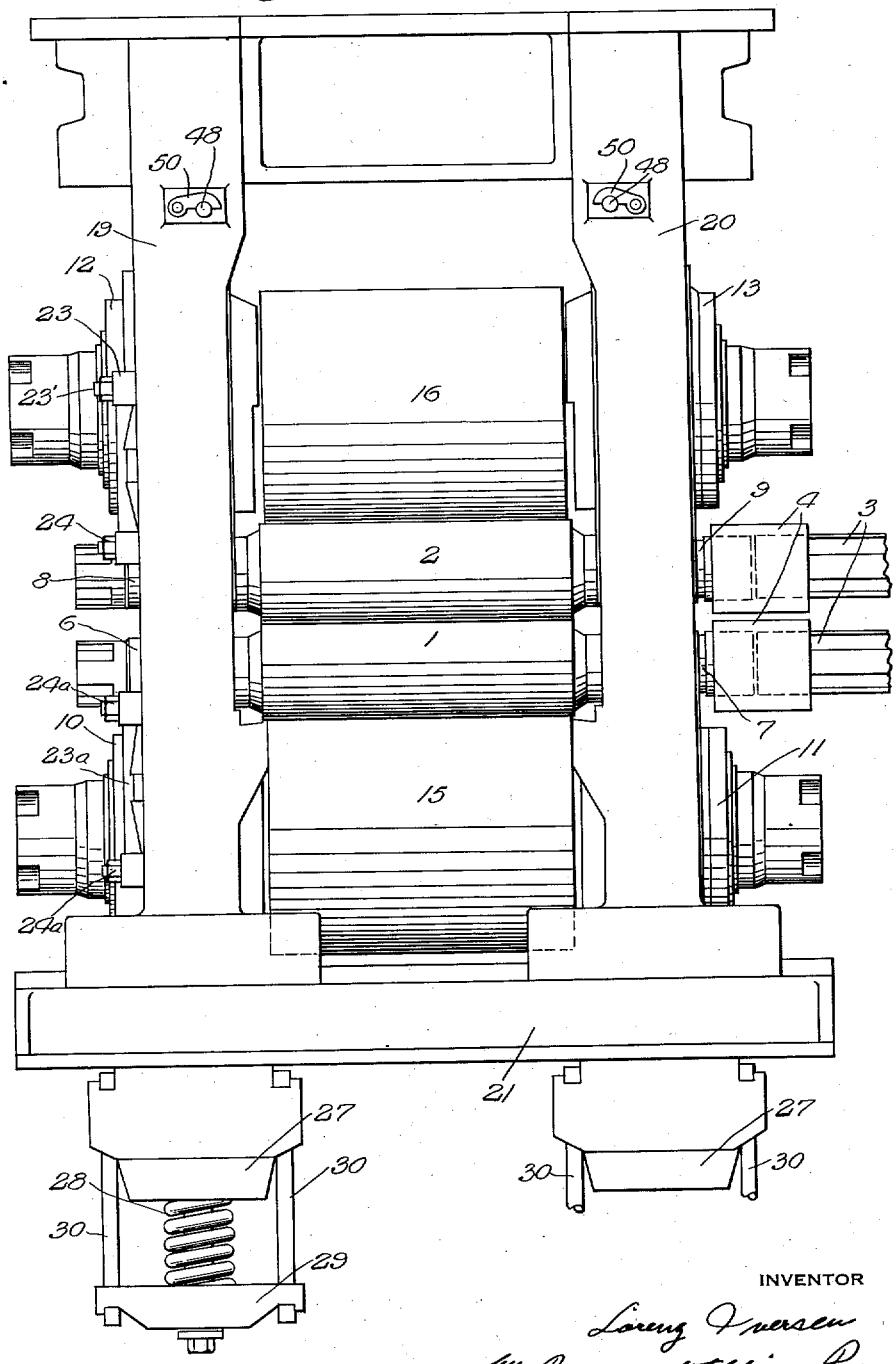
Figure 2:
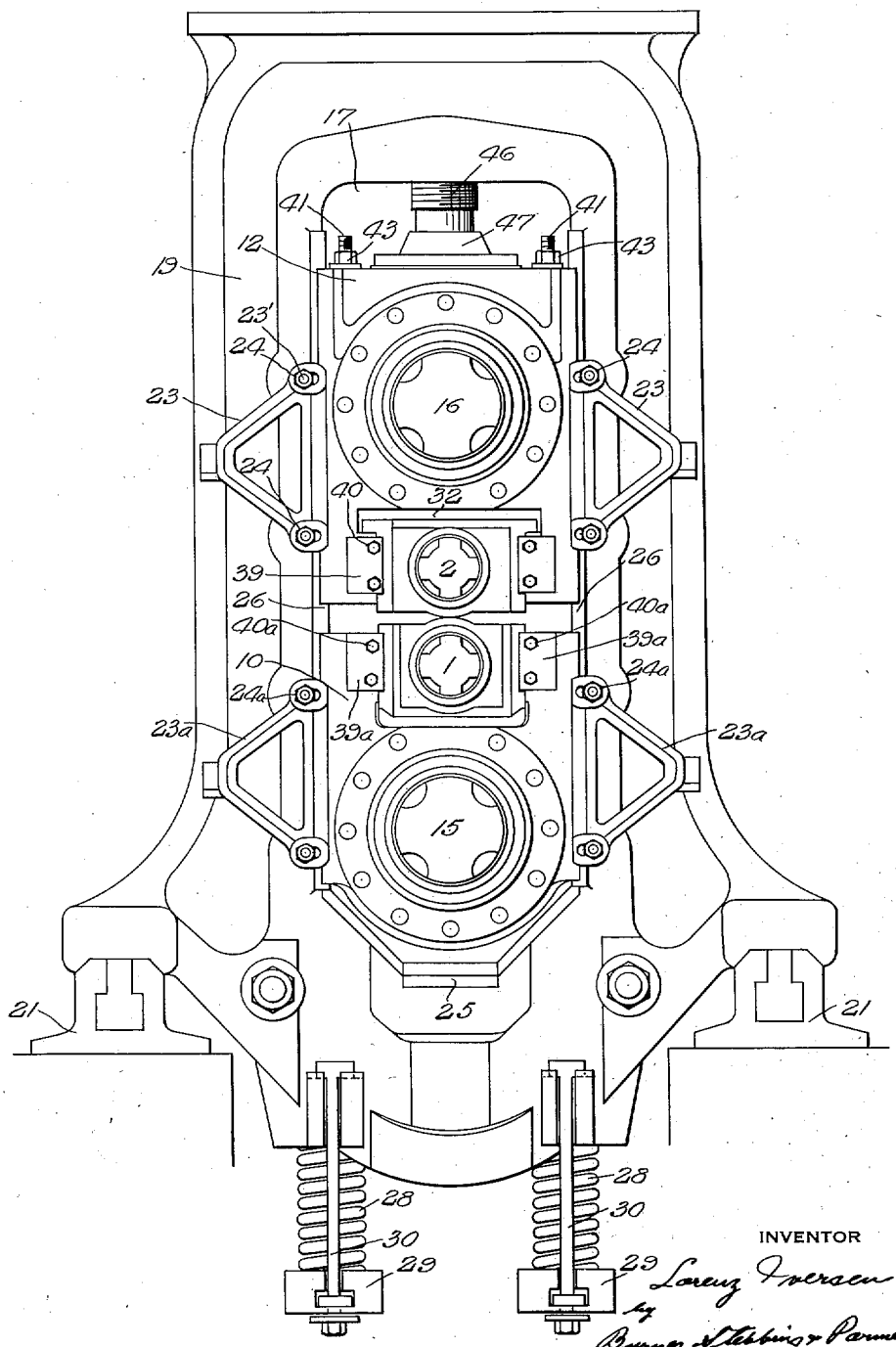
Figure 3:
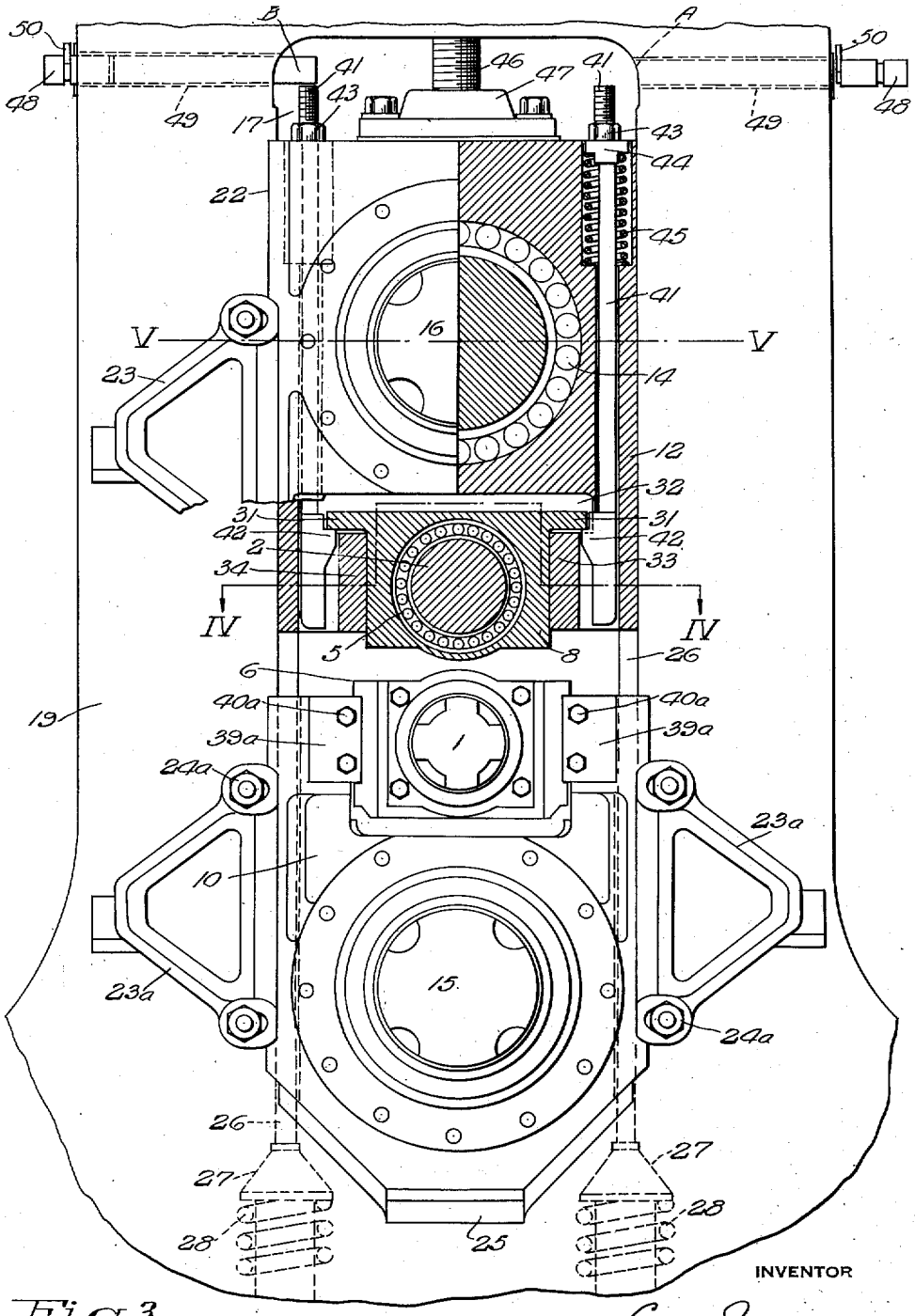
Figure 4:
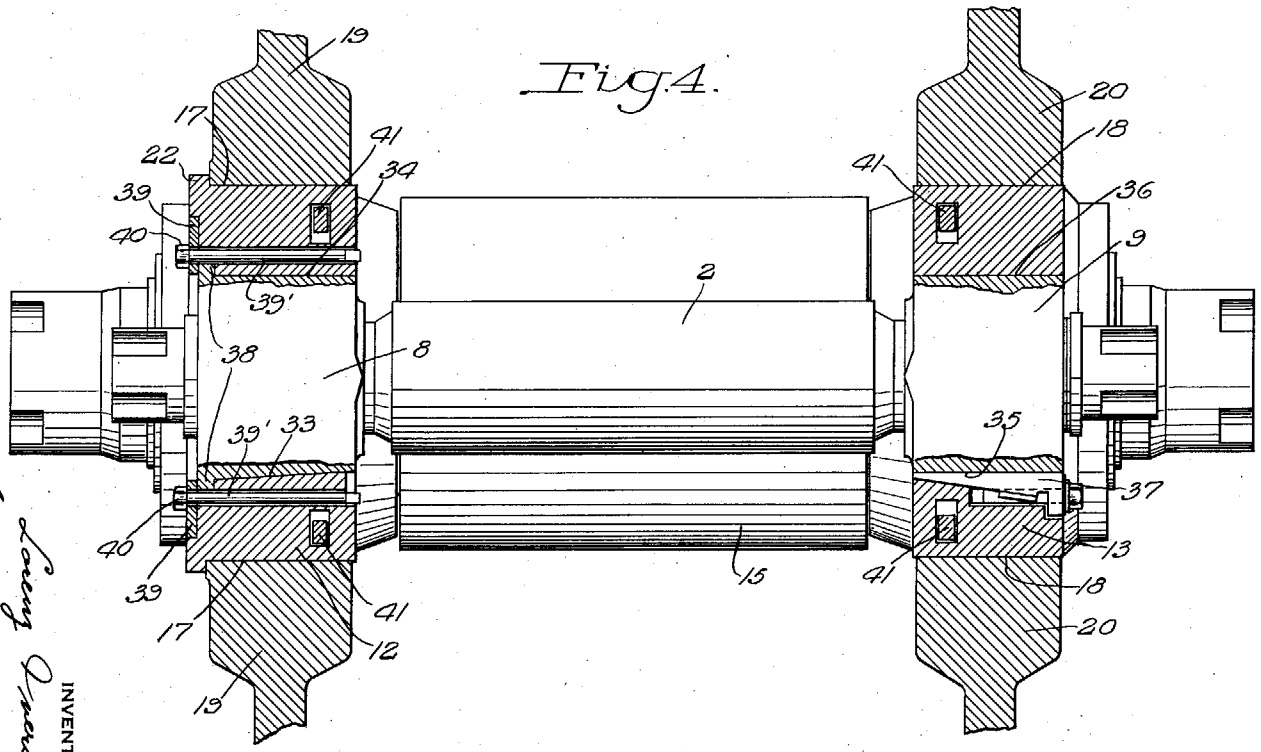
Figure 5:
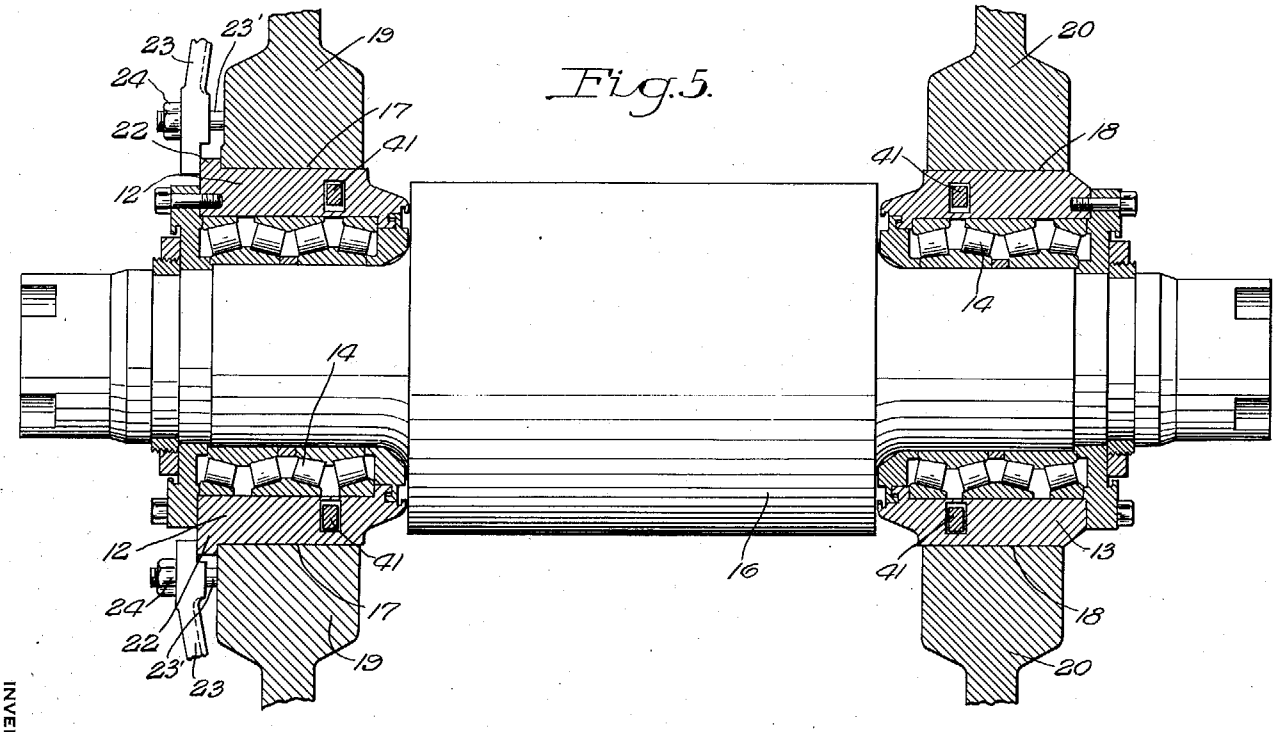

In the accompanying drawings, which illustrate the present preferred embodiment of my invention, Figure 1 is a front elevation of a backed-up mill, Figure 2 is a side elevation, Figure 3 is an enlarged side elevation, parts being shown in section, Figure 4 is a section on the line IV—IV of Figure 3, and Figure 5 is a section on the line V—V of Figure 3.

Referring to the drawings, working rolls 1 and 2, which are driven from a source of power through spindles 3 and coupling boxes 4, are journalled in anti-friction bearings 5 of bearing chucks 6, 7, 8 and 9 (see Figs. 1 and 3). These chucks in turn are mounted in bearing chucks 10, 11, 12 and 13 respectively, which house the anti-friction bearings 14 for the journals of the backing rolls 15 and 16 (see Fig. 5). The bearing chucks 10, 11, 12 and 13 are mounted in windows 17 and 18 of the mill housing 19 and 20 which rest on mill shoes 21, as shown in Figure 2.

The bearing chucks 12 and 13 of top backing roll 16 are secured to the necks of the roll and are movable endwise into and out of the mill housings 19 and 20 with the roll 16 through window 17. As shown in Figures 3 and 5, the bearing chuck 12 has flanges 22 which engage and bear against the outer face of the mill housing 19 as the chucks and roll are moved into position. In this manner longitudinal centering of the roll 16 and its associated parts is automatically accomplished and having been once properly determined is not thereafter dependent upon the skill of the operator. The backing roll 16 and its bearing chucks 12 and 13 are retained in the desired position in the mill housings 19 and 20 by means of clamps 23, bolts 23′ and nuts 24, on bolts 23′ passing through slots or elongated openings in the clamps and permitting lateral adjustment thereof.

The bottom backing roll 15 with its bearing chucks 10 and 11 is moved into and out of the mill housings 19 and 20 and retained therein in a similar manner (see Figs. 1 and 3). The bearing chucks 10 and 11 of the lower backing roll 15 rest on blocks 25 (see Figures 1 and 3), which are supported by the mill housings 19 and 20 at the bottoms of the windows 17 and 18 (see Figure 4).

The bearing chucks 12 and 13 of the top backing roll 16 rest on rods 26 which in turn are supported on spring caps 27 and springs 28, the load on which is transmitted to the mill housings 19 and 20 by yokes 29 and bolts 30 (see Figure 2).

The bearing chucks 8 and 9 of the top working roll 2 are secured to the necks of the roll and may be moved into and out of position in the bearing chucks 12 and 13 in the mill housings 19 and 20 with the roll 2 through the housing window 17. As shown in Figure 3, lugs 31 of the bearing chucks 8 and 9 slide into recesses 32 provided in the bearing chucks 12 and 13. These lugs serve to support the roll 2 and its bearing chucks 8 and 9 at times of roll changing, and also serve for the suspension of the roll 2 when it is in operating position, as will be explained later.

The bearing chucks 8 and 9 of roll 2 are constrained against sidewise movement by faces 33, 34, 35 and 36, arranged in bearing chucks 12 and 13, as shown in Figures 3 and 4. The face 33 is tapered to facilitate the entry of the chucks 8 and 9 when moving roll 2 into position in the mill. Face 35 is provided with an adjustable wedge 37, whereby the normal clearance for bearing chuck 9 can be increased at times of roll changing.

Furthermore, the minimum clearance between faces 33 and 34 is made greater than the normal clearance between faces 35 and 36, in order to further facilitate the moving of roll 2 and its bearing chucks into operating position. By these means a close fit is made possible for the bearing chucks 8 and 9 in bearing chucks 12 and 13 to insure accurate alinement between working roll 2 and its backing roll 16. This construction, in conjunction with anti-friction bearings on both working and backing rolls, which bearings are not subject to perceptible wear, makes it possible to maintain indefinitely an accurate alinement of the working roll with its backing roll.

The working roll 2 is held against longitudinal movement by bearing chuck 8 having lugs 38 which cooperate with clamps 39, bolts 39′ and nuts 40 to clamp the lugs 38 against the bearing chuck 12 (see Figure 4).

The face of the top working roll 2 is held in contact with the face of its backing roll 16 by means of suspension rods 41 having projections 42 engaging the lugs 31 of the bearing chucks 8 and 9 (see Figs. 3 and 4). These suspension rods are carried by means of adjusting nuts 43 and spring caps 44 on springs 45 supported in the bearing chucks 12 and 13. In this manner the top working roll 2 is suspended from the bearing chucks 12 and 13 of the top backing roll 16, and is maintained in contact with and moves up and down with the roll 16.

The weight of the bottom working roll 1 with its bearing chucks 6 and 7 is carried on the face of its backing roll 15. The roll 1 is held against longitudinal and transverse movement in bearing chucks 10 and 11 in a manner similar to that described in connection with the working roll 2.

The adjustment of the space between working rolls 1 and 2 to vary the thickness of the material being rolled is accomplished in the usual manner by means of screw-downs 46. These screw-downs at their lower ends bear on blocks 47 which rest on bearing chucks 12 and 13 respectively, which are in turn carried on springs 28 in the manner described. As these screw-downs are moved downwardly they cause the springs 28 to be compressed beyond their initial tension. As they are moved upwardly the springs 28 will expand to a predetermined limit and the initial spring tension will be restored. This initial tension is so selected as to fully support the weight of bearing chucks 12, 13, 8 and 9 assembled complete with rolls 16 and 2.

If such upward movement is continued after the springs 28 have expanded to their limit, then the screw downs will lose contact with blocks 47 and the bearing chucks 12 and 13 of the top backing roll 16 will be released but remain supported on the rods 26. By removing nuts 24 and clamps 23 the roll chucks 12 and 13 with rolls 16 and 2 are then free for removal as a unit from the mill housings 19 and 20.

As already stated, it is more frequently desirable to remove only the working rolls 1 and 2 from the mill housings. Removal of the top working roll 2 is facilitated by the provision of pins or stops 48 slidable in holes 49 in the mill housings 19 and 20 (see Figs. 1 and 3). Normally these stops are held in their inoperative position indicated at "A" by means of latches 50. When it is desired to exchange or remove the top working roll 2 independently of its backing up roll these stops are moved into the operative position indicated at "B". The screw downs are then moved upwardly until the suspension rods 41 come into contact with the now projecting portions of stops 48. This checks any further upward movement of the working roll 2 and its associated parts including chucks 8 and 9 and rods 41 while permitting continued upward movement of the backing roll and its associated parts including chucks 12 and 13. As upward movement of the screw downs is continued the expansion of springs 28 will overcome the tension of the weaker springs 45 and cause the bearing chucks 12 and 13 with backing roll 16 to follow the movement of the screw downs, the chucks 8 and 9 with working roll 2 remaining stationary.

This operation is continued until lugs 31 of the chucks 8 and 9 are engaged by and receive support from the bottoms of the recesses 32 in the bearing chucks 12 and 13. This stage of the operation occurs upon continuing the upward movement of chucks 12 and 13 slightly above the position illustrated in Figure 3. Upward movement of the screw downs is then discontinued, and bearing chucks 8 and 9 with top working roll 2 are released and are free for removal from the bearing chucks 12 and 13 and the mill housings 19 and 20 after removal of nuts 40 and clamps 39 (see Figure 4).

If it is next desired to remove the top backing roll, the screw downs (see Figs. 3 and 1) are lowered until the stops 48 are released. These stops are then moved into their inoperative position indicated at "A" and the bearing chucks 12 and 13 with roll 16 are released in the manner already described.

The bottom working roll 1 (see Figs. 3 and 1), with its bearing chucks 6 and 7 is released for removal by removing nuts 40ᵃ and clamps 39ᵃ similar to those of the top working roll chuck 8 (see Figs. 2 and 4).

The bottom backing roll 15 (see Figs. 3 and 1) with its bearing chucks 10 and 11 is removable from the mill housings 19 and 20 by removing nuts 24ᵃ and clamps 23ᵃ similar to those of the top backing roll chuck 12 (see Figure 5). The bottom backing and working rolls with their chucks assembled may also be removed as a unit from the mill housings 19 and 20, the same as in the case of the top rolls.

The reinstallation of rolls into the mill housings 19 and 20 is accomplished by reversing the operations described.

Either working roll can be removed from the mill housings, together with its bearing chucks, without dismantling either backing roll. This is a point of decided advantage since the working rolls are subject to redressing at relatively frequent intervals.

After a working roll has been removed, its backing roll with bearing chucks assembled is also readily removable from the mill housings. Furthermore it is feasible to remove a backing roll together with its working roll with bearing chucks assembled complete as one unit.

Any of these operations can be carried out without disassembling any parts except the nuts and clamps above referred to.

Novel features have also been provided in the bearing chucks of the backing rolls to provide clearance for easy entry of the bearing chucks of the working rolls at times of roll changing.

While I have illustrated and described the present preferred form of my invention, it is to be understood that the invention may be otherwise embodied within the scope of the following claims, it being adapted to almost any type of backed up mill upon the making of such changes in design and arrangement of the parts as dictated by the particular characteristics of the mill.

I claim as my invention:

1. In a mill, a backing roll, a chuck therefor, a working roll carried by said chuck, a rigid supporting surface in said chuck in one horizontal plane, and a resilient supporting surface in said chuck in a different horizontal plane, said surfaces being successively effective for supporting the working roll upon relative vertical movement between the chuck and working roll.

2. In a rolling mill, housings having roll windows therein, bearing chucks in said windows, a backing roll journaled in said bearing chucks additional bearing chucks mounted in said first-mentioned chucks for vertical movement relative thereto, and a working roll journaled in said additional chucks.

3. In a rolling mill, housings, bearing chucks in said housings, a backing roll journaled in said chucks, additional bearing chucks and means for resiliently supporting them in said first-mentioned bearing chucks, a working roll journaled in said additional bearing chucks, and means for rendering said resilient supporting means inoperative.

4. In a rolling mill, a housing, bearing chucks mounted therein, a backing roll journaled in said bearing chucks, additional bearing chucks carried by said first-mentioned bearing chucks, a working roll journaled in said additional chucks, means for normally pressing the faces of the working roll and backing roll resiliently together, and other means for supporting the working roll from said backing roll chucks.

5. In a rolling mill, housings, bearing chucks therein, a backing roll journaled in said bearing chucks, additional bearing chucks supported on said first-mentioned bearing chucks, a working roll journaled in said additional bearing chucks, pressure means mounted on the backing roll bearing chucks for maintaining the faces of the working and backing rolls in contact, and means for rendering said pressure means inoperative.

6. In a rolling mill, a housing, anti-friction bearings mounted therein for adjustment in a plurality of directions, a backing roll journaled in said bearings, additional anti-friction bearings supported on said first-mentioned bearings, a working roll journaled in said additional bearings, the working roll bearings being out of contact with the housing.

7. In a rolling mill, a housing, bearing chucks mounted therein for adjustment in a plurality of directions, anti-friction bearings in said chucks, a backing roll journaled in said bearings, additional bearing chucks having anti-friction bearings suspended from the backing roll bearing chucks out of contact with said housing, and a working roll journaled in the bearings of said last mentioned chucks.

8. In a rolling mill, a housing, bearing chucks mounted in said housing for adjustment in a plurality of directions, a backing roll mounted in said chucks, additional bearing chucks mounted in said first-mentioned bearing chucks out of contact with said housing, anti-friction bearings in said second-mentioned chucks, and a working roll journaled therein.

9. In a rolling mill, a housing, bearing chucks therein, anti-friction bearings in the chucks, a backing roll journaled in the bearings, additional bearing chucks supported in said first-mentioned chucks out of contact with said housing, anti-friction bearings in said additional chucks, a working roll journaled in said bearings, and means cooperating with the backing roll bearing chucks for holding the faces of the working roll and backing roll together.

10. In a rolling mill, a housing, bearing chucks therein, a backing roll journaled in said chucks, openings in said chucks, additional chucks therein having anti-friction bearings, and a working roll in said bearings.

11. In a rolling mill, a housing, bearing chucks therein having adjustable openings, a backing roll journaled in said chucks, additional chucks received in the openings in said backing roll chucks, and a working roll journaled in said additional chucks.

12. In a rolling mill, a housing, bearing chucks therein, openings in said chucks of different widths, a backing roll journaled in said chucks, additional chucks received in the openings in said backing roll chucks, and a working roll journaled in said additional chucks.

13. In a rolling mill, a housing, bearing chucks mounted therein having openings, a backing roll journaled in said chucks, additional chucks in said openings having anti-friction bearings, and a working roll journaled in said bearings.

14. In a rolling mill, a housing, bearing chucks vertically slidable in the housing, a backing roll journaled in said chucks, additional bearing chucks extending within said first-mentioned chucks, a working roll journaled in said additional chucks, means for maintaining the faces of the working and backing rolls in contact, and means for rendering said last mentioned means ineffective on movement of the backing roll chuck in one direction in the housing.

15. In a rolling mill, housings, bearing chucks therein, a backing roll journaled in said chucks, additional bearing chucks mounted in the backing roll chucks, a working roll journaled in said additional chucks, means on said backing roll chucks for supporting the working roll chucks, and means for supporting the additional chucks independently of said backing roll chucks to permit removal of the working roll independently of the backing roll.

16. In a rolling mill, housings, bearing chucks mounted therein, a backing roll journaled in said chucks, additional bearing chucks suspended from said first-mentioned chucks, a working roll journaled in said additional chucks, and means for supporting the working roll chucks independently of their suspension from the backing roll chucks, to permit independent removal of the working roll and its chucks from the housing.

17. A rolling mill comprising housings, bearing chucks therein, a backing roll journaled in said chucks, additional bearing chucks supported in said first-mentioned chucks, a working roll journaled in said additional chucks, means engaging the backing roll chucks for pressing the faces of the working and backing rolls together, and means for rendering said last mentioned means inoperative whereby the working roll and its bearing chucks is independently removable from said housings.

18. In a mill, a housing, bearing chucks therein, a backing roll journaled in said chucks, additional chucks in said first-mentioned chucks movable axially and transversely of the backing roll, and a working roll journaled in said additional chucks.

19. In a mill, a housing, bearing chucks therein, a backing roll journaled in said chucks, additional chucks carried in said first-mentioned chucks, a working roll journaled in said additional chucks, means on the backing roll chucks for removably supporting the working roll chucks, and means for resiliently suspending the working roll chucks from the backing roll chucks independently of said last mentioned means.

20. In a mill, a housing, bearing chucks therein, a backing roll journaled in said chucks, additional chucks within said first-mentioned chucks, a working roll journaled in said additional chucks, and means in said first-mentioned chucks for removably supporting said additional chucks.

21. In a rolling mill, a housing, bearing chucks therein having openings, a backing roll journaled in said chucks, additional chucks mounted in said openings, a working roll journaled in said additional chucks, and removable means in one of the backing roll chucks for partly filling said opening.

22. In a mill, a housing, bearing chucks therein, additional chucks therein, means in the first-mentioned chucks for suspending the additional chucks therefrom, independent means for holding the additional chucks within the first-mentioned chucks, and means engaging said last mentioned means on movement of the first-mentioned chucks to transfer the additional chucks from the independent resilient supporting means to the means on said first-mentioned chucks.

23. In a mill, a housing, a chuck therein, a roll journaled in said chuck, additional chucks extending within said first-mentioned chucks, means on the first-mentioned chuck for supporting the additional chucks, and independent means for resiliently supporting the additional chucks from the first-mentioned chucks.

24. In a mill, a housing, bearing chucks therein, a backing roll journaled in said chucks, additional chucks extending within said backing roll chucks, and means on the first-mentioned chucks for supporting the additional chucks in different horizontal planes successively on relative vertical movement between the first-mentioned chucks and the additional chucks.

25. In a rolling mill, the combination with a housing provided with a vertically movable casing having a backing roll journalled therein, of a chock slidably mounted in said casing, a working roll journalled in said chock, and a member yieldingly connected to said casing and while thus connected movable to and completely from a position engaging said chock for urging said working roll yieldingly into driving contact with said backing roll.

LORENZ IVERSEN.